March 1, 1949. C. F. SCHNEIDER 2,462,908
REFORMING TOOL
Filed April 20, 1945

INVENTOR.
Charles F. Schneider
BY
Ralph L Chappell
ATTORNEY.

Patented Mar. 1, 1949

2,462,908

UNITED STATES PATENT OFFICE 2,462,908

RE-FORMING TOOL

Charles F. Schneider, New York, N. Y.

Application April 20, 1945, Serial No. 589,443

4 Claims. (Cl. 81—15)

(Granted under the act of March 3, 1883, as amended April 30, 1928; 370 O. G. 757)

This invention relates to the repair of gaskets and more particularly to a tool for repairing general-service metal-and-asbestos gaskets.

The general-service gasket with which the tool of this invention is used is conventional and consists of a roll of thin stainless steel strip wound in a spiral and having a thin metal reenforcing ring fitted to it. To adapt this to a pipe flange, one turn of the metal strip is left loose after spot welding. In handling, the ring frequently becomes detached from the spirally wound portion so that the loose strip becomes twisted and bent making it very difficult to re-assemble the gasket. The damaged portion cannot be cut off without impairing the tightness of the gasket against leakage. Hitherto it has been a slow and tedious operation to re-form the damaged portion with the result that the spirally wound portion has been discarded and replaced with a new one from stock. The tool of the present invention enables the damaged portion of the loose strip to be quickly and accurately re-formed thereby reclaiming the spirally wound portion without the loss that would otherwise occur.

One object of this invention is to provide an inexpensive means for repairing damaged gaskets.

Another object is to provide a portable tool that can be carried in a tool kit or pocket.

Figure 1:
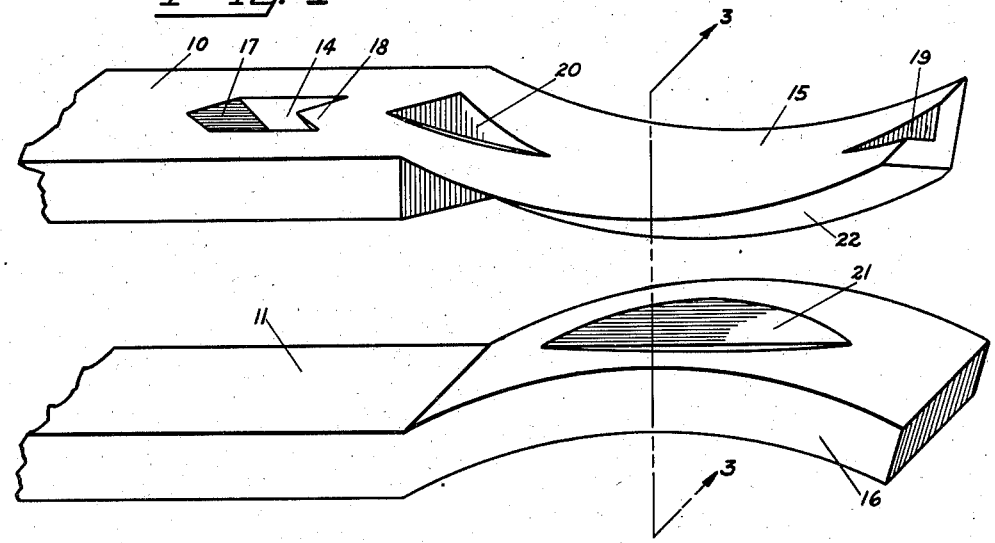
Figure 2:
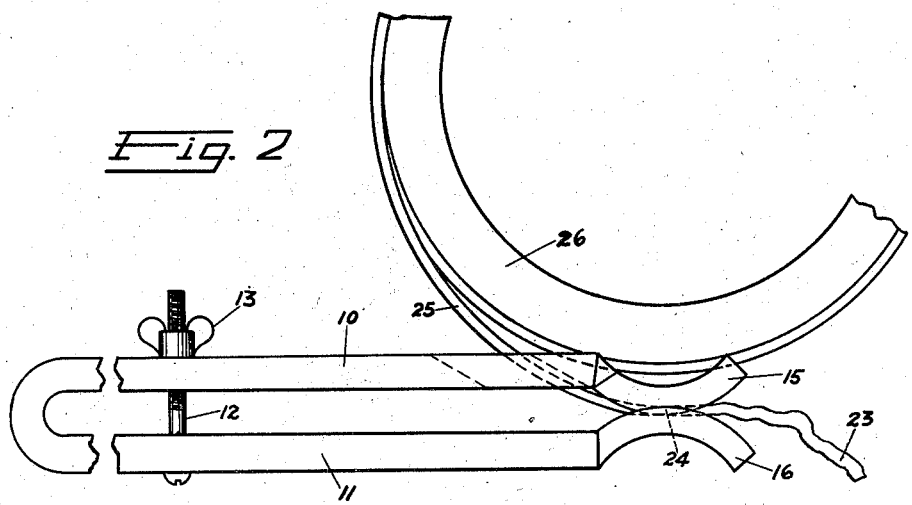
Figure 3:
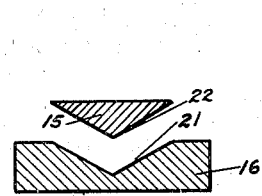
Figure 4:
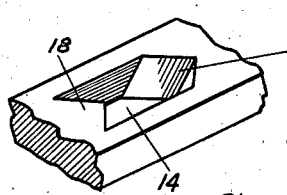

Further objects and advantages of this invention, as well as its construction, arrangement and operation, will be apparent from the following description and claims in connection with the accompanying drawings, in which, Fig. 1 is a perspective view of the shaping portion of this invention with the jaws separated or open, Fig. 2 is a view of this invention in operation with the jaws closed, Fig. 3 is a cross-section taken along the line 3—3 in Fig. 1 and Fig. 4 is an enlarged view of the slot detail shown in Fig. 1.

In Fig. 1 there is shown a tweezer-like pincers consisting of two arms 10 and 11 under a tension tending to separate them. A screw 12 (Fig. 2) and manually operated wing nut 13 (Fig. 2) grip arms 10 and 11 and serve both to restrain the movement of arms 10 and 11 outwardly away from each other and to move said arms closer together.

Near the end of arm 10 is a slot 14. An arcuate member or jaw 15 extends from the end of arm 10. At the foot of arm 11 is another arcuate member or jaw 16 shaped so that its convex side can be made to occlude or mate with the concave side of the arcuate member 15.

The arcuate members 15 and 16 as well as the arm 10 have grooves therein shown in Figs. 1, 3 and 4. A substantially V-shaped notch 17 is cut into the face of the arm 10 at the rear end of the slot 14. A projection 18 is disposed along the front wall of slot 14. Two other substantially V-shaped notches 19 and 20 are cut into the concave side of the arcuate member 15, one notch 19 being formed at the tip of said arcuate member 15 and the notch 20 being formed in the area where the concave side of arcuate member 15 joins the end of the arm 10.

A substantially V-shaped channel 21 is formed on the convex side of the arcuate member 16 and acts to receive in mating engagement a raised portion 22 that is disposed on the convex side of the arcuate member 15.

In operation the distorted steel strip 23 plus a small length of undistorted steel strip 24 is inserted through the slot 14, and the arcuate members 15 and 16 are brought into mating engagement so that the undistorted steel strip 24 is gripped by arcuate members 15 and 16. Wing nut 13 is turned tight to maintain the pressure on the steel strip 24.

The tool is placed in a vise and the re-formed steel ribbon 25 is pressed flush against the outer rim of the gasket 26 by rotating the gasket 26 which is positioned to partially seat in the notches 18 and 19 and by applying manual pressure on the gasket 26 toward the re-formed steel ribbon 25 during rotation so that the re-formed steel ribbon 25 hugs the outer rim of the gasket 26.

The tool can be used to repair the damaged periphery of any circular gasket provided the grooves or configurations on the periphery prior to damage can be formed by the continuous motion of the drawing the damaged periphery through a preformed die. A change in the shape of the periphery merely requires a change in the shape of the channels, notches and elevations made in the gasket-repairing tool herein described.

Modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A gasket-repairing pincers-like tool comprising two arms, gripping means disposed at the extremities of said arms, means secured to said arms for altering and maintaining the separation or occlusion of said gripping means, a slot in one arm, opposed shaping surfaces on said gripping means, and gasket-seating grooves disposed on the outward surface of that element of the gripping means which extends from the arms having the slot therein.

2. A substantially U-shaped gasket-repairing pincers tool having two arcuate members extending from the extremities of the arms of said U-shaped pincers with their convex sides in opposed relationship, a wing nut for altering and maintaining the separation or occlusion of said arcuate members, a slot in one arm of said tool, a substantially V-shaped notch disposed in the rear wall of said slot and a diamond-shaped elevation disposed in the front wall of said slot, a diamond-shaped surface rising from the convex side of said arcuate member extending from said slotted arm, V-shaped gasket-seating notches in the concave side of said arcuate member extending from said slotted arm, and a substantially diamond-shaped channel in the convex side of the arcuate member extending from the unslotted arm.

3. A tool comprising two arms connected for movement in a plane toward and away from each other, the extremities of said arms being arcuate in said plane of movement and being disposed with their convex sides in opposed relation, the convex sides of said arcuate extremities being formed with shaping surfaces in said plane of movement, one of said arms on its concave side being formed with a locating groove in said plane of movement, and one of said arms being formed with a slot.

4. A tool for shaping a strip and for guiding the strip relative to the periphery of an annular gasket, said tool comprising two arms connected for movement in a plane toward and away from each other, the extremities of said arms being arcuate in said plane of movement and being disposed on their convex sides in opposed relation, one of said arcuate extremities being formed on its convex side with a channel extending in said plane of movement and the other of said arcuate extremities being formed on its convex side with a raised portion extending in said plane of movement and forming a shaping surface adapted to mate with the channel shaping surface to shape and guide the strip, said other arcuate extremity on its concave side being formed with a locating groove in said plane of movement for locating the tool relative to the annular gasket, and the arm having said other extremity being formed with a slot therethrough.

CHARLES F. SCHNEIDER.

REFERENCES CITED

The following references are of record in the file of this patent:

UNITED STATES PATENTS

| Number | Name | Date |
| --- | --- | --- |
| 190,642 | Stouffer | May 8, 1877 |
| 1,666,801 | Varney | Apr. 17, 1928 |
| 2,211,528 | Tays | Aug. 13, 1940 |
| 2,255,161 | Gray | Sept. 9, 1941 |
| 2,289,637 | Ernest | July 14, 1942 |

FOREIGN PATENTS

| Number | Country | Date |
| --- | --- | --- |
| 302 | Australia | Jan. 26, 1926 |